United States Patent [19]

Peppers

[11] Patent Number: 5,004,311
[45] Date of Patent: Apr. 2, 1991

[54] BEAM SCANNING METHOD AND APPARATUS

[75] Inventor: Norman A. Peppers, Belmont, Calif.
[73] Assignee: SRI International, Menlo Park, Calif.
[21] Appl. No.: 428,344
[22] Filed: Oct. 27, 1989
[51] Int. Cl.⁵ .............................................. G02B 26/08
[52] U.S. Cl. ..................................... 350/6.9; 350/6.5; 350/6.7
[58] Field of Search .............................. 350/6.1–6.91; 250/235

[56] References Cited

U.S. PATENT DOCUMENTS

| | | | |
|---|---|---|---|
| 3,847,466 | 11/1974 | Forse | 350/7 |
| 4,054,361 | 10/1977 | Noguchi | 350/7 |
| 4,196,961 | 4/1980 | Walter et al. | 350/6.8 |
| 4,318,582 | 3/1982 | Minoura et al. | 350/6.6 |
| 4,368,488 | 1/1983 | Sakamoto | 358/208 |
| 4,388,651 | 6/1983 | Sherman | 358/206 |
| 4,424,442 | 1/1984 | Kitamura | 250/236 |
| 4,464,011 | 8/1984 | Takahashi et al. | 350/6.1 |
| 4,478,480 | 10/1984 | Doggett | 350/6.7 |
| 4,492,970 | 1/1985 | Lee et al. | 346/160 |
| 4,496,209 | 1/1985 | Itoh et al. | 350/6.8 |
| 4,714,310 | 12/1987 | Peppers et al. | 350/6.6 |
| 4,759,593 | 7/1988 | Kessler | 350/6.6 |

FOREIGN PATENT DOCUMENTS

| | | |
|---|---|---|
| 0016630 | 10/1980 | European Pat. Off. |
| 0027646 | 2/1977 | Japan . |
| 0063915 | 4/1983 | Japan . |

OTHER PUBLICATIONS

"Laser Printer Scanning System with a Parabolic Mirror", Matsuda et al, Applied Optics/vol. 17, No. 6, Mar. 15, 1978, pp. 878–884.

Primary Examiner—Bruce Y. Arnold
Assistant Examiner—Thong Nguyen
Attorney, Agent, or Firm—Victor R. Beckman

[57] ABSTRACT

Beam scanning method and apparatus are shown comprising a cylindrical mirror upon which a focused beam is directed through the focus of the cylindrical mirror. The axis of the focused beam is pivoted about the focus of the cylindrical mirror for scanning the focused beam across the cylindrical mirror such that the axis of the focused beam reflected from the cylindrical mirror undergoes translational movement. A focus defect is introduced in the focused beam by reflection from the cylindrical mirror, the magnitude of which defect is a function of the angle between the optical axis of the cylindrical mirror and focused beam axis. Astigmatism is introduced in the focused beam directed onto the cylindrical mirror for at least partial compensation of the focus defect. By varying the astigmatism as a function of the angle between the optical axis of the cylindrical mirror and focused beam axis the focus defect may be eliminated when a parabolic cylindrical mirror is employed. Although either a circular or parabolic cylindrical mirror may be used, a parabolic cylindrical mirror is preferred to minimize the focus defect.

22 Claims, 5 Drawing Sheets

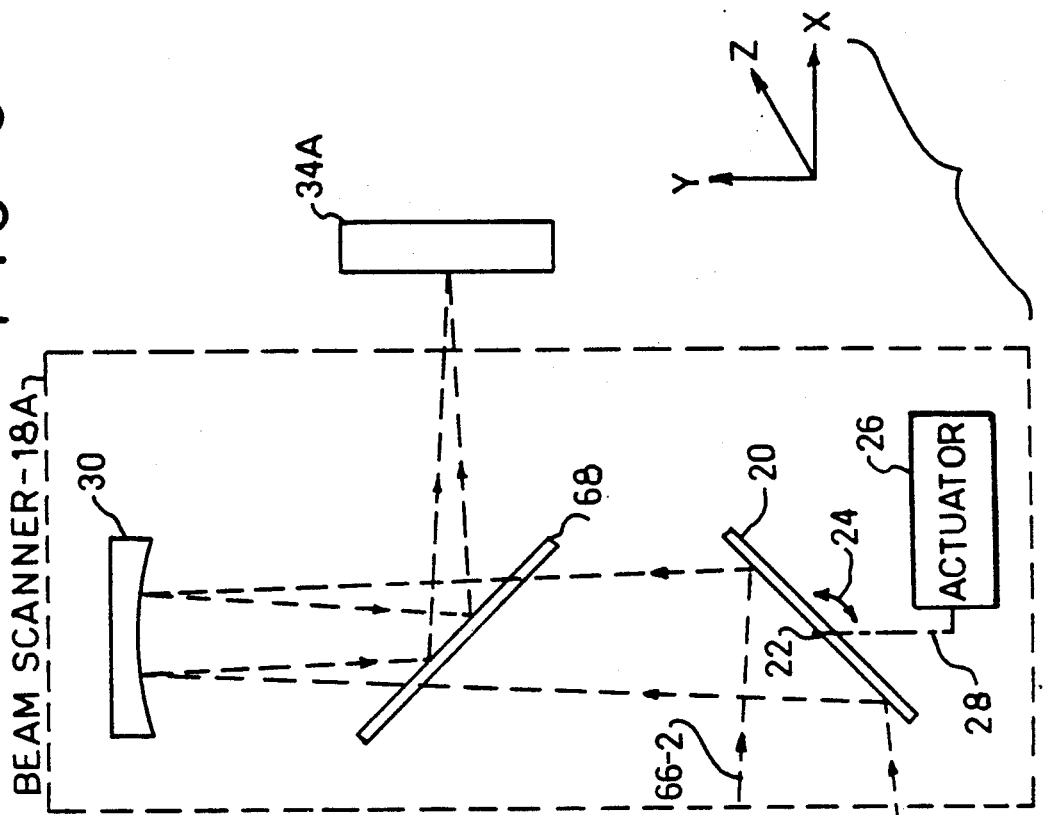

BEAM SCANNING METHOD AND APPARATUS

TECHNICAL FIELD

This invention relates to method and apparatus for scanning focused radiant energy beams, such as focused laser beams, and more particularly to a light-weight, simple, inexpensive and easily implemented system of a type wherein the incident scanning beam is normal to a straight scanning line.

BACKGROUND OF THE INVENTION

Laser beam scanning systems are widely used as for example in the exposure of printing plates, inspection of printed circuit boards, and the like. They fall into two general categories;

(1) those that use pre-deflection optics, i.e. the laser beam passes through a focusing lens before it is deflected as by a rotating polygon, oscillating mirror, or the like, and (2) those that use post-deflection optics, i.e. the laser beam passes through focusing optics after it is deflected.

In the pre-deflection optic case, a very simple inexpensive lens is adequate to produce a diffraction-limited focused spot. However, with such systems the locus of the focused spot is not a straight line but is, in general, a curved line. If, for example, the deflector is an oscillating mirror whose axis of rotation is in the plane of the mirror, the locus of the focused spot is an arc of a circle. Generally, the desired path of the focused spot is a straight line in which case the laser beam will be out of focus on the straight line except at one or two points where the arc is tangent to or intersects the line.

In some post-deflection systems a complex, expensive lens is employed in an attempt to maintain the laser beam in focus on a straight line. Because the angular field-of-view of such a lens must be large, lens design compromises often are made whereby not only is the focused spot degraded from perfection (diffraction limited) but also the locus of the best focus deviates from a straight line.

In some applications, such as in the inspection of printed circuit boards, it is highly desirable to cause the beam to be incident perpendicular to the scanned surface. This is not possible in prior art predeflection optics systems. A post-deflection configuration is known using a telecentric lens in which the scanning beam is normal to the scanned surface. However, the telecentric lens must be at least as large as the scan line is long and therefore telecentric systems are prohibitively expensive except for systems that require only very short scan lines.

SUMMARY AND OBJECTS OF THE INVENTION

An object of this invention is the provision of a radiant energy beam scanning system and method of the pre-deflection optic type which provides for focusing of the beam along a straight line with substantially any desired degree of accuracy of focusing.

An object of this invention is the provision of a scanning system and method of the above-mentioned type in which the beam is incident normal to the scanned line.

An object of this invention is the provision of a scanning system and method of the above-mentioned type which avoids shortcomings and disadvantages of prior art beam scanning systems.

The present invention includes a radiant energy source together with focusing lens means for focusing radiation from the source. The focused beam is directed onto a cylindrical mirror through the focus of the mirror. The beam is scanned across the cylindrical mirror whereby the axis of the beam reflected therefrom is provided with a translational movement. Scanning may be provided as by use of a pivotally mounted reflecting means located at the focus of the cylindrical mirror. Beam rays in one plane which intersects the mirror along a straight line focus along a straight line, whereas beam rays in a second plane normal to said one plane focus along a curved line nearer the mirror due to focusing action of the mirror in the second plane and not in the first plane. Correction of such focus defect may be provided by introduction of astigmatism in the focused beam. Partial correction of such focus defect may be provided by inclusion of a fixed cylinder lens in the focused beam prior to deflection thereof to introduce a fixed astigmatism in the converging beam. Full correction may be provided by use of dynamic focus compensation means which introduces a variable astigmatism in the focused beam that is a function of the angle between the optical axis of the cylindrical mirror and the incident beam axis. The cylindrical mirror preferably is of a parabolic type but may be of the circular type in which case a less precise focus is obtained.

BRIEF DESCRIPTION OF THE DRAWINGS

The invention together with further objects and advantages thereof will be better understood from the following description considered with the accompanying drawings. It will be understood that the illustrated embodiments of the invention are by way of example only and that the invention is not limited thereto. In the drawings, wherein like reference characters refer to the same parts in the several views;

FIG. 6 is a diagrammatic plan view showing a modified form of focused beam scanning system that includes use of a fixed astigmatic focused beam source for partial correction of the focus defect;

FIG. 7 is a cross-sectional view of the astigmatic focused beam taken along line 7—7 of FIG. 6.

DESCRIPTION OF THE PREFERRED EMBODIMENTS

Figure 1:
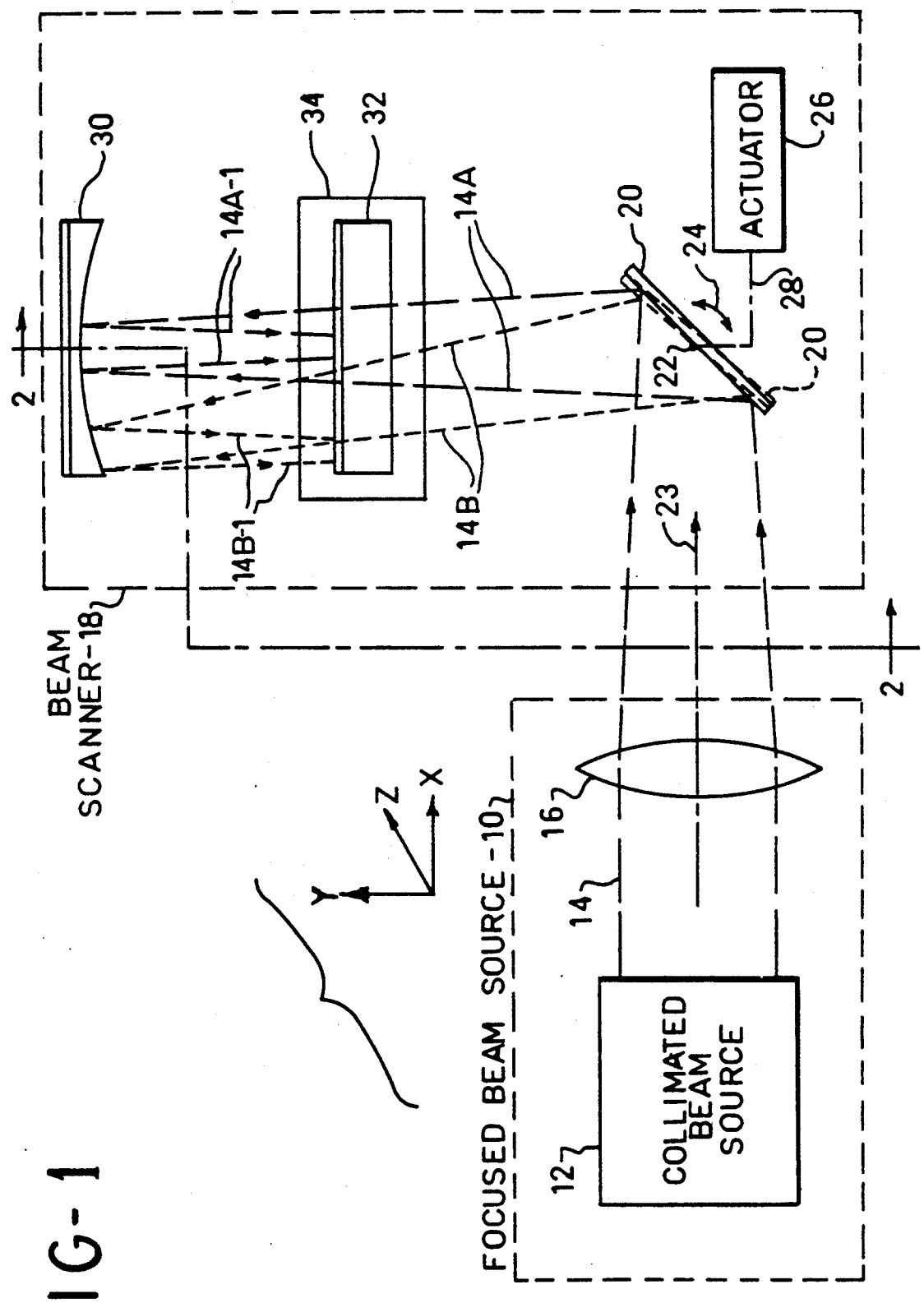
FIG. 1 is a diagrammatic plan view showing a focused beam scanning system embodying the present invention.
Figure 2:
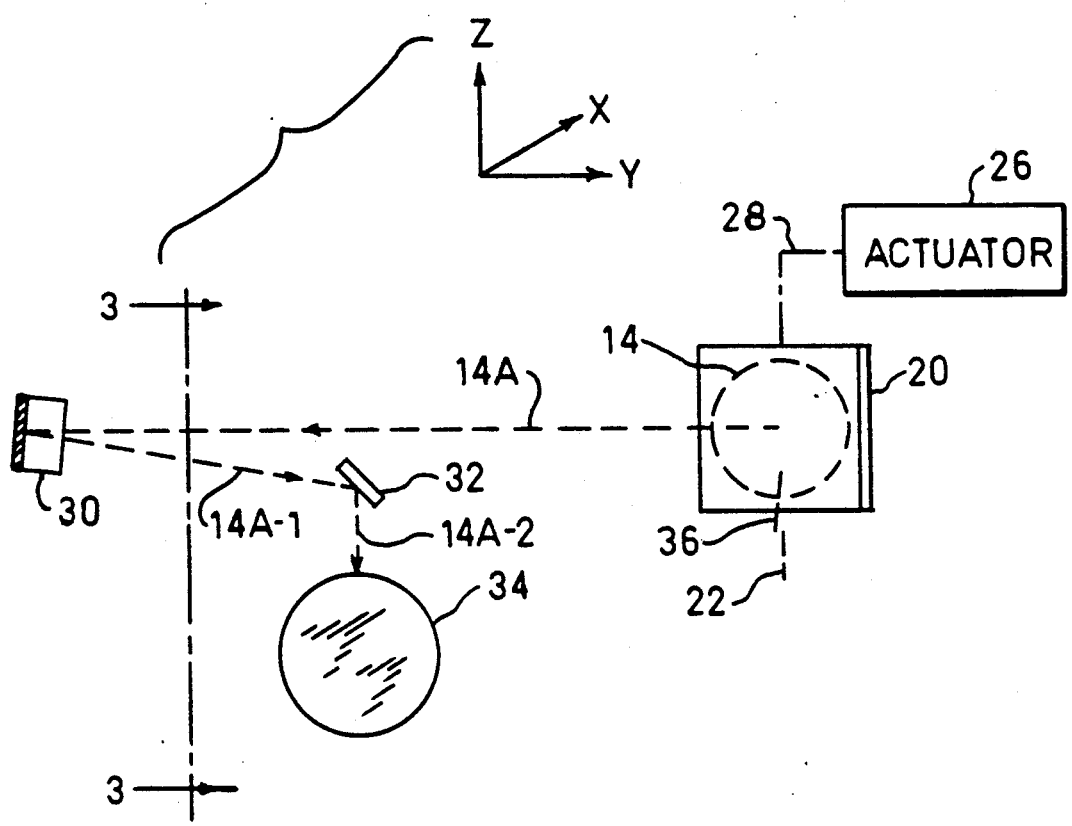
FIG. 2 is a sectional view taken along line 2—2 of FIG. 1.
Figure 3:
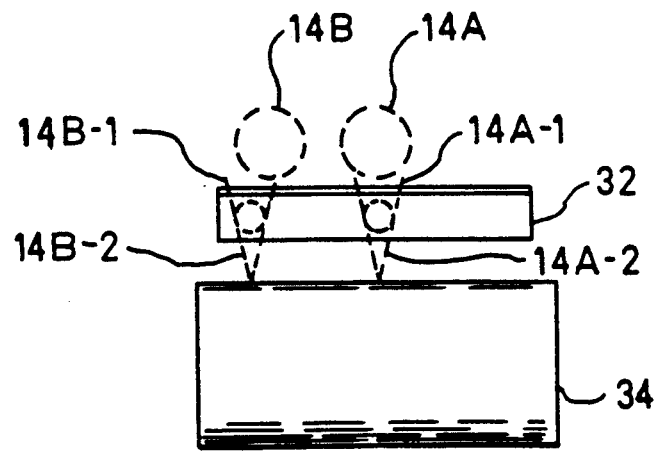
FIG. 3 is a sectional view taken along line 3—3 of FIG. 2.

Reference first is made to FIGS. 1, 2 and 3 of the drawings wherein a novel beam scanning system is shown which includes a focused radiant energy beam source 10. The focused beam source 10 may include, for example, a collimated beam source 12, such as a laser, for generating a radiant energy beam 14, together with focusing lens means 16 for focusing the beam.

From source 10, the focused beam is directed onto beam scanning means 18 which imparts a scanning motion to the focused beam. Scanning means 18 is shown comprising movable deflecting means 20 upon which the focused beam from source 10 is incident. For purposes of illustration only, and not by way of limitation, deflecting means 20 may comprise a plane mirror mounted for pivotal movement about axis 22 extending in the Z direction normal to the plane of the drawing, in the plane of the mirror at the beam axis 23. Pivotal movement of the mirror, in the direction of double-headed arrow 24, is shown provided by connection of the mirror to actuating means 26 through connecting means 28.

With pivotal movement of mirror 20, the focused beam reflected from the mirror is scanned transversely across the face of a parabolic cylindrical mirror 30, in the X direction. Two positions of mirror 20 are illustrated in FIG. 1; one in full line and the other in broken line. The focused beam deflected by mirror 20 in the full-line position thereof is identified by reference character 14A, and the beam deflected by mirror 20 in the broken-line position thereof is identified by reference character 14B. The beam passes over a fixed position plane mirror 32 in travel from scanning mirror 20 to parabolic cylindrical mirror 30. Parabolic cylindrical mirror 30 is tilted downwardly slightly, as best seen in FIG. 2, for small downward deflection of the beam from parabolic cylindrical mirror 30 onto plane mirror 32. From plane mirror 32 the beam is reflected onto object 34 to be scanned. For purposes of illustration only, the object to be scanned comprises a cylinder along which the beam is axially moved along a straight line path. Beams 14A and 14B reflected by parabolic cylindrical mirror 30 are identified by reference characters 14A-1 and 14B-1, and corresponding beams reflected from plane mirror 32 are identified by reference characters 14A-2 and 14B-2, respectively.

With the present invention the axis of the focused beam directed onto parabolic mirror 30 passes through the line of principal focus of mirror 30. To this end, pivot axis 22 of plane pivotal mirror 20 is coincident, or substantially coincident, with the line of principal focus of parabolic cylindrical mirror 30. Due to the slight tilt of mirror 30, the line of principal focus of mirror 30, or extension thereof, intersects pivot axis 22. In FIG. 2, the line of principal focus of parabolic cylindrical mirror 30 is identified by reference character 36.

Figure 5:
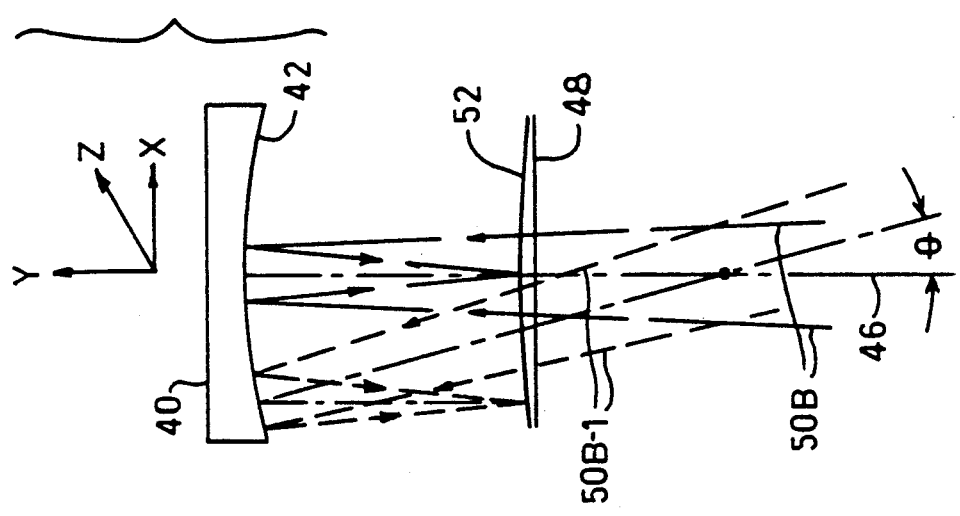
FIGS. 4 and 5 are longitudinal and transverse sectional views of a parabolic cylindrical mirror and incident beam for use in illustrating a focus defect for rays travelling in a plane extending transversely of the mirror.
Figure 4:
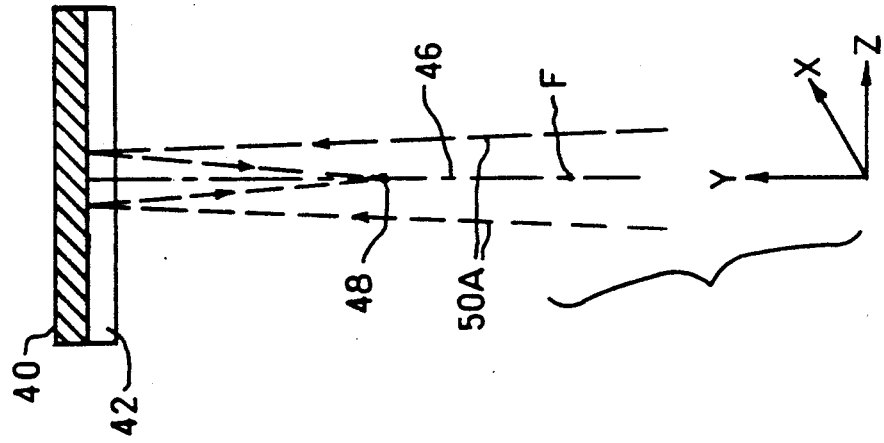

Properties of a parabolic cylindrical mirror of which use is made in scanning systems of the present invention and which introduce a focus defect in the focused beam are illustrated in FIGS. 4 and 5, to which figures reference now is made. Parabolic cylindrical mirror 40 shown therein has a face 42, the two-dimensional cross-section of which in the X,Y plane has the mathematical shape of a parabola. At any plane Z=constant the shape is the same. It will be clear that( mirror 40 has no optical power for rays travelling in the Y,Z plane (FIG. 4) and has optical power for rays travelling in the X,Y plane (FIG. 5). A useful property of the mirror that is a direct consequence of its parabolic shape is that the path length from the focus F of the parabola to the mirror and then to a straight line perpendicular to the axis of the parabola is a constant. Reference character 48 identifies such a line perpendicular to the axis of the parabola. Consequently converging fan rays in a plane perpendicular to the X,Y plane, such as rays 50A shown in FIG. 4, launched from the focus F of parabola 42 will be reflected by the mirror and will be brought to focus on a line perpendicular to the axis 46 of the parabola, since the mirror has no optical power for this fan of rays. In the illustrated arrangement, fan of rays 50A is shown focused along straight line 48. Another property of the parabolic cylindrical mirror is that the axis of fan rays 50A intersects line 48 at an angle of 90 degrees. Thus, the axis of the beam reflected from the parabolic cylindrical mirror undergoes translational movement in response to change in the angle $\theta$ between the beam axis and the optical axis of the parabolic cylindrical mirror 40.

As seen in FIG. 5, for converging fan rays 50B travelling in the X,Y plane, mirror 40 has optical power such that these rays are brought to a focus before fan rays 50A. There is, therefor, a "focus defect" for rays travelling in the X,Y plane. Focus defect simply is defined as the distance between the actual focal position and the desired focal position. If focus along line 48 is desired, then the focus defect is for rays travelling in the X,Y plane. As seen in FIG. 5, rays travelling in the X,Y plane focus along line 52 ahead of straight line 48. The focus defect is not constant but rather is a monotonic function of the off-axis angle $\theta$. This focus defect is present in the scanning system shown in FIGS. 1 and 2 and described above. For focusing along a straight line at the face of object 34, the straight line to be scanned along object 34 generally would be located at line 48. For many applications such focus defect is tolerable.

Much of the focus defect can be eliminated by introducing static astigmatism in the converging laser beam. Reference now is made to FIG. 6 wherein a modified form of this invention is shown which includes an astigmatic focused beam source 60. Source 60 is of the same type shown in FIG. 1 except that in addition to collimated beam source 12 and focusing lens means 16 it includes a cylindrical lens 62 of low power. The portion of the beam from source 12 to cylinder lens 62 is identified by reference character 66, the portion between cylinder lens 62 and focusing lens 16 is identified by reference character 66-1, and the beam from astimatic focused beam source 60 is identified by reference numeral 66-2. For purposes of illustration only, a plano-concave type cylinder lens 62 is shown. The longitudinal axis of cylinder lens 62 extends in the Z direction whereby the lens functions to diverge a fan of rays travelling in the X,Y plane. A cross-sectional view of the diverging beam 66-1 from lens 62 as viewed along line 7—7 is shown in FIG. 7 which shows the elliptical shape thereof. Alternatively, a plano-convex, or convex-convex, cylindrical lens may be employed instead of a plano-concave lens 62, the longitudinal axis of which extends in the Z direction for divergence of a fan of rays travelling in the X, Y plane. Lens 62 has no optical power for rays from source 12 in planes parallel to the X,Z plane and therefore they remain collimated in travel to spherical focusing lens 16. From cylinder lens 62, the beam passes through focusing lens 16 whereby an astigmatic focused beam 66-2 is obtained from beam source 60.

The astigmatic focused beam 66-2 from source 60 is directed onto pivotal deflecting means 20 included in a modified form of beam scanner 18A. Beam scanner 18A includes a parabolic cylindrical mirror 30 the focus of which is located at pivot axis 22 of mirror 20. The axis of the focused beam 66-2 is directed at the focus of mirror 30 whereby the axis of the focused beam directed onto mirror 30 passes through the focus of mirror 30. Actuator 26 functions to pivot mirror 20 about axis 22 in the direction of arrow 24 in the manner of the FIGS. 1-3 arrangement for sweeping the focused beam across the parabolic cylindrical mirror 30.

In the FIG. 6 arrangement a half-mirror, or beam splitter, 68 is included in the beam path between pivotal deflecting means 20 and parabolic cylindrical mirror 30. That portion of the beam which is transmitted through beam splitter 68 is reflected from parabolic cylindrical mirror 30 back onto beam splitter 68 where the reflected portion thereof is reflected onto object 34A to be scanned. For purposes of illustration, object 34A is shown to include a plane surface which is scanned by the focused beam. Although there is a major loss of beam energy at beam splitter 68, an advantage of this arrangement is that no tilting of the longitudinal axis of parabolic cylindrical mirror 30 and/or vertical axis of mirror 68 is required. In the FIG. 6 arrangement, the astigmatism introduced into the focused beam functions to bring the curved-line focus closer to the straight-line focus. (In FIG. 5, curved line focus 52 would be brought closer to straight-line focus 48 by inclusion of cylindrical lens 62 in the path of the focused beam.) As noted above, astigmatism in the focused beam could be used to bring the straight-line focus closer to the curved line by inclusion of a plano-convex or convex-convex cylindrical lens in the focused beam path, with the longitudinal axis thereof at rightangles to that of cylindrical lens 62. Also, a combination of such cylindrical lenses could be employed, if desired. Generally, however, focusing along a straight line is desired, in which case a plano-convex, or convex-convex, cylindrical lens such as that shown in FIG. 6 would be employed. With the arrangement of FIG. 6, the residual focus defect would be zero for converging rays in the Y,Z plane and would be very small for converging rays in X,Y plane.

Figure 8:
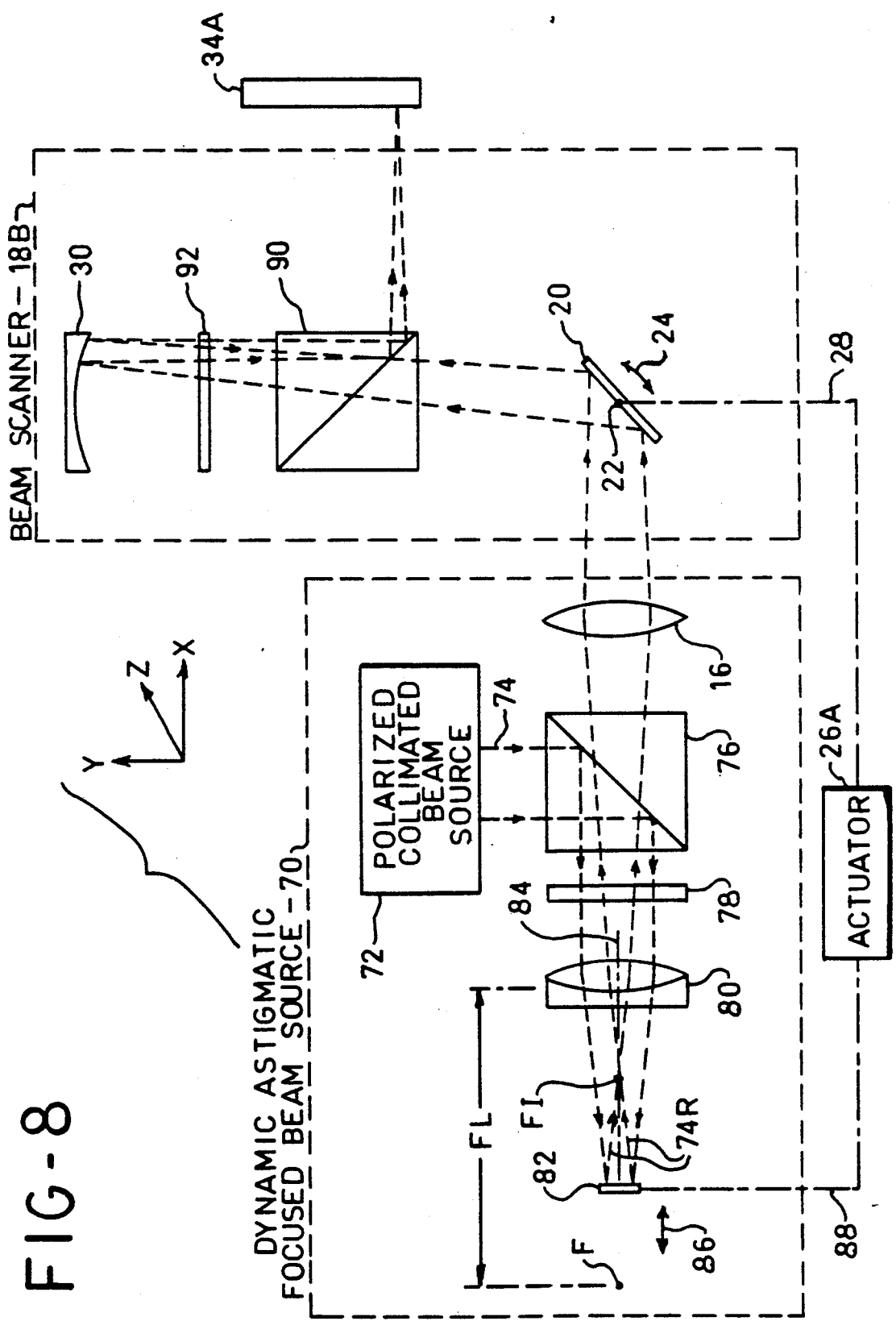
FIG. 8 is a diagrammatic plan view showing another modified form of focused beam scanning system that includes a dynamic astigmatic focused beam source for full correction of the focus defect.

The residual, one-dimensional, focus defect may be eliminated entirely by use of a dynamic focus compensation device in the system whereby the amount of astigmatism introduced into the focused beam is dependent upon the angle between the optical axis of the parabolic cylindrical mirror and the axis of the focused beam impinging thereon. Such an arrangement is shown in FIG. 8, to which figure reference now is made. The system illustrated in FIG. 8 includes a dynamic astigmatic focused beam source 70 for generating a focused beam having dynamically controlled astigmatism. Source 70 may be of the type shown in U.S. Pat. No. 4,714,310 by N.A. Peppers et al., the entire disclosure of which patent specifically is incorporated by reference herein. For purposes of illustration, source 70 includes a polarized collimated beam source 72 including, for example, a laser and associated means for producing a collimated and polarized light beam 74.

The polarized collimated laser beam 74 is incident on a polarizing beam splitter 76 where it is reflected through a quarter-wave phase plate 78 to cylindrical focusing lens means 80, the longitudinal axis of which lens means extends in the Z direction. The beam is reflected back through the cylindrical lens means 80 and quarter-wave phase plate 78 to the polarized beam splitter 76 by a small light-weight plane reflecting means 82, such as a plane mirror. Mirror 82 is movable back and forth along the optical axis 84 of cylindrical focusing lens means 80 under control of actuator means 26 connected thereto through connecting means 88. The light beam reflected from mirror 82 is identified by reference character 74R. The reflected beam, having passed twice through quarter-wave plate 78 is fully transmitted by the polarizing beam splitter 76. The beam is focused by focusing lens 16, from whence it is directed onto pivotal deflecting means 20 included in beam scanner 18B.

Cylindrical focusing lens means 80 has a focal length FL such that rays in the X,Y plane of a collimated beam are brought to focus at the principal focus, or focal point, F, thereof. Light rays in the X,Z plane remain collimated in passing through cylindrical focusing lens means 80, and the collimation thereof is independent of the position, or motion, of plane mirror 82. As seen in FIG. 8, plane mirror 82 is located ahead of the principal focus F of cylindrical focusing lens means 80 such that an image, FI, of focal point F is formed ahead of plane mirror 82. After passage of reflected beam 74R rays through cylindrical focusing lens 80, rays travelling in the X,Y plane diverge as seen in FIG. 8 thereby introducing astigmatism in the beam. The amount of divergence is dependent upon the position of plane mirror 82 along the beam axis. As plane mirror 82 is moved forward toward cylindrical focusing lens 80 divergence increases, and with rearward movement divergence decreases. (If plane mirror 82 were located at the principal focus F of cylindrical focusing lens means 80, beam 74R reflected by mirror 82 would be recollimated by the cylindrical focusing lens.) In operation, movement of plane mirror 82 is confined to travel ahead of the principal focus F whereby fan rays in the X,Y plane of the reflected beam 74R diverge upon emerging from cylindrical focusing lens means 80, with the amount of divergence being dependent upon the position of plane mirror 82. As noted above, light rays in the Y,Z plane remain collimated independent of the motion of plane mirror 82 prior to passage through focusing lens means 16.

The beam scanner 18B is similar to scanner 18A shown in FIG. 6 except that a polarized beam splitter 90 and quarter-wave phase plate 92 are located between the pivotal beam deflecting means 20 and parabolic cylindrical mirror 30. The polarized astigmatic focused beam from source 70 is deflected by pivotal deflecting means 20 and passes through polarized beam splitter 90 and quarter-wave phase plate 92 in travel to the parabolic cylindrical mirror 30. The beam reflected from parabolic cylindrical mirror 30 again passes through quarter-wave phase plate 92 whereby the beam is reflected at polarized beam splitter 90 onto object 34A. As with the other embodiments, the focus of parabolic cylindrical mirror 30 is located at the face of pivotal mirror 20 at pivot axis 22 whereby the focused beam axis passes through the focus of parabolic cylindrical mirror 30 in all pivotal positions of mirror 20.

As noted above, astigmatism is produced that is a function of the position of plane mirror 82. The amount of astigmatism that is required to eliminate the focus defect (illustrated in FIG. 5) may be calculated as a function of the angular position of pivotal mirror 20 and the optical parameters, whereby mirrors 82 and 20 may be moved in proper synchronization under control of actuating means 26A so as to completely eliminate the focus defect. Obviously, other means for synchronizing movement of the plane and pivotal mirrors may be provided including for example a servomechanism for driving the plane mirror 82 in response to the sensed angular position of pivotal mirror 20.

The invention having been described in detail in accordance with requirements of the Patent Statutes, other changes and modifications will suggest themselves to those skilled in this art. For example, the pivotal scanning mirror 20 may be deleted from the system, and the focused beam source (10, 60, or 70) may be movably mounted for directing the focused beam onto the parabolic cylindrical mirror along a line extending through the focus of the parabolic cylindrical mirror. In this case the focused beam source may be located either behind or ahead of the focus of the parabolic cylindrical mirror. Also, a circular cylindrical mirror may be employed in place of parabolic cylindrical mirror 30 which would result in a focus defect. However, for some applications a circular cylinder mirror may be used where accuracy of focusing provided by parabolic cylinder mirror 30 is not required. In general circular cylindrical mirrors are easier to produce at a lower cost than parabolic cylindrical mirrors. It is intended that such changes and modifications shall fall within the spirit and scope of the present invention as defined in the appended claims.

I claim:

1. A scanning system for scanning a focused beam comprising:
    a focused beam source means for producing a focused radiant energy beam having a beam axis;
    A cylindrical mirror upon which the focused radiant energy beam is directed and from which the beam is reflected along a reflected beam axis, the beam axis along which the focused radiant energy beam is directed onto the mirror extending substantially through the focus of said mirror; and
    means for scanning the focused radiant energy beam across the cylindrical mirror for translational movement of the reflected beam axis, the focused radiant energy beam from the focused beam source being astigmatic for at least partial compensation of a focus defect produced by reflection of the beam by the cylindrical mirror.

2. A scanning system as defined in claim 1 wherein the focused beam source means includes a cylindrical lens to provide the focused radiant energy beam with astigmatism.

3. A scanning system as defined in claim 1 wherein said focused beam source means includes means for dynamically controlling astigmatism of the focused energy beam for substantially complete compensation of the focus defect during scanning of the beam.

4. A scanning system as defined in claim 3 wherein said focused beam source means includes,
    a collimated beam source,
    cylindrical focusing leans means in the path of the collimated beam,
    movable plane reflection means for reflecting the beam from the cylindrical focusing lens means back through said cylindrical focusing lens means, and
    means for moving the plane reflecting means along the beam axis for controlling divergence of the reflected beam from the cylindrical focusing lens means in a plane for which the cylindrical focusing lens has optical power.

5. A scanning system as defined in claim 1 wherein the scanning means comprises pivotal beam deflecting means at the focus of said cylindrical mirror upon which the focused radiant energy beam from the focused beam source mean is directed for deflection onto said cylindrical mirror, and
    means for pivoting said deflecting means for scanning the focused radiant energy beam across said cylindrical mirror.

6. A scanning system as defined in claim 1 including reflecting means upon which the focused beam reflected from the cylindrical mirror is directed for changing the beam direction.

7. A scanning system as defined in claim 6 wherein said reflecting means comprises a plane fixed mirror.

8. A scanning system as defined in claim 6 wherein said reflecting means comprises a half-mirror through which the focused beam passes in travel to the cylindrical mirror.

9. A scanning system as defined in claim 6 wherein said reflecting means comprises a polarized beam splitter through which the focused beam passes in travel to the cylindrical mirror, and
    a quarter-wave phase plate in the beam path between said polarized beam splitter and cylindrical mirror.

10. A scanning system as defined in claim 1 wherein said cylindrical mirror is of the parabolic type.

11. A scanning system as defined in claim 1 wherein said cylindrical mirror is of the circular type.

12. A scanning system for scanning a focused beam comprising:
    a cylindrical mirror;
    means for directing a focused radiant energy beam onto said cylindrical mirror along an axis that extends substantially through the focus of the cylindrical mirror, the focused beam being reflected from said cylindrical mirror along a reflected beam axis;
    means for pivoting the focused radiant energy beam axis about said focus for scanning the focused radiant energy beam across the cylindrical mirror and for substantially translational movement of the reflected beam axis; and
    means for producing astigmatism in the focused radiant energy beam directed onto said cylindrical mirror for at least partial compensation of a focus defect produced by reflection of the focused beam from said cylindrical mirror.

13. A scanning system as defined in claim 12 wherein said means for producing astigmatism produces astigmatism which remains unchanged during operation of said pivoting means.

14. A scanning system as defined in claim 12 including
    means for varying astigmatism provided by said astigmatism producing means in synchronization with pivotal movement of said focused radiant energy beam.

15. A scanning system as defined in claim 12 wherein said cylindrical mirror is of the parabolic type.

16. A scanning system as defined in claim 12 wherein said cylindrical mirror is of the circular type.

17. A method of scanning a focused radiant energy beam comprising;
    directing the focused beam onto a cylindrical mirror along an axis extending substantially through the focus of the cylindrical mirror from which mirror the focused beam is reflected along a reflected focused beam axis;
    scanning the focused beam across the cylindrical mirror by pivoting the beam axis about the focus of the cylindrical mirror for substantially translational movement of the axis of the reflected focused beam; and introducing astigmatism into the focused radiant energy beam directed onto said cylindrical mirror to compensate for a focus defect introduced into said beam by reflection from said cylindrical mirror.

18. A method of scanning as defined in claim 17 wherein the cylindrical mirror has an optical axis, and including varying the astigmatism introduced into the focused radiant energy beam in an amount related to the angle between the optical axis of the cylindrical mirror and the axis of the focused beam directed onto said cylindrical mirror.

19. A method of scanning as defined in claim 17 wherein the scanning step includes, directing the focused beam onto a pivotally mounted mirror located at the focus of the cylindrical mirror for deflection from said pivotally mounted mirror onto said cylindrical mirror, and pivoting said pivotally mounted mirror for scanning the focused beam across the cylindrical mirror.

20. A method of scanning as defined in claim 19 wherein astigmatism introduced into the focused radiant energy beam is variable, and varying the astigmatism in synchronization with pivotal movement of the pivotally mounted mirror.

21. A method of scanning as defined in claim 17 wherein the step of directing the focused beam onto a cylindrical mirror comprises directing the focused beam onto a parabolic cylindrical mirror.

22. A method of scanning as defined in claim 17 wherein the step of directing the focused beam onto a cylindrical mirror comprises directing the focused beam onto a circular cylindrical mirror.

* * * * *